Figure 1:
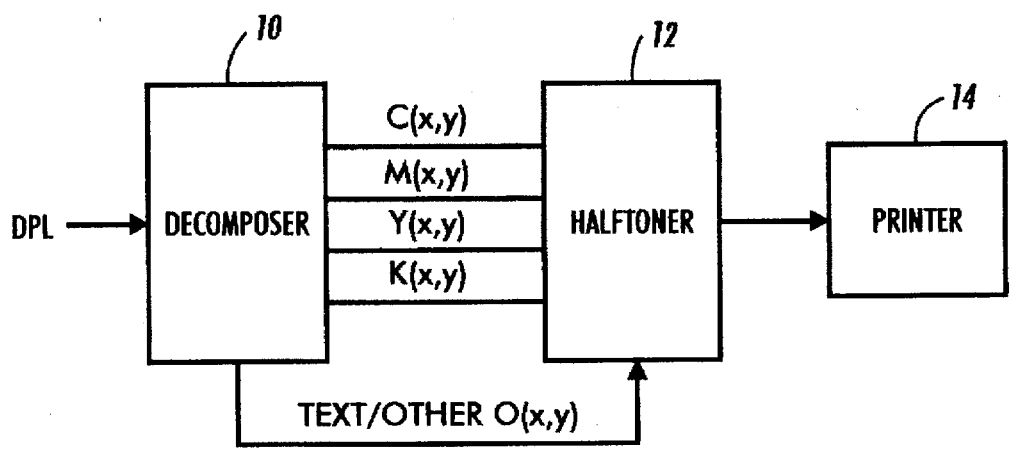

United States Patent [19]
Ebner

[11] Patent Number: 5,689,344
[45] Date of Patent: Nov. 18, 1997

[54] MITIGATION OF TENTING DELETIONS IN COLOR XEROGRAPHIC PRINTERS

[75] Inventor: Fritz F. Ebner, Rochester, N.Y.

[73] Assignee: Xerox Corporation, Stamford, Conn.

[21] Appl. No.: 638,656

[22] Filed: Apr. 29, 1996

[51] Int. Cl.$^6$ .................... H04N 1/40; H04N 1/46
[52] U.S. Cl. .................... 358/298; 358/456; 358/466; 358/535
[58] Field of Search .................... 358/298, 455–466, 358/534–536

[56] References Cited

U.S. PATENT DOCUMENTS

| | | | |
|---|---|---|---|
| 4,149,194 | 4/1979 | Holladay | 358/283 |
| 5,170,261 | 12/1992 | Cargill et al. | 358/298 |
| 5,467,422 | 11/1995 | Itihara et al. | 358/298 |
| 5,515,479 | 5/1996 | Klassen | 395/109 |
| 5,528,384 | 6/1996 | Metcalfe et al. | 358/447 |

*Primary Examiner*—Eric Frahm
*Attorney, Agent, or Firm*—Mark Costello

[57] ABSTRACT

A printing system that uses a halftone processor is driven to halftone selected areas of an image based on a selected halftone dot, wherein the halftone dot has the properties of maintaining a dot fill order of a desired dot, while also maintaining a preselected percentage of the dot as untilled space.

11 Claims, 4 Drawing Sheets

| 1 | 9 | 4 | 12 |
|---|---|---|---|
| 16 | 5 | 13 | 8 |
| 3 | 11 | 2 | 10 |
| 14 | 7 | 15 | 6 |
BAYER DOT
FIG. 3A
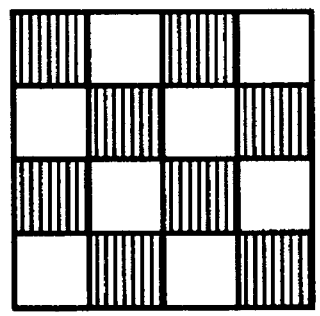
BAYER DOT AT
50% COVERAGE
FIG. 3B
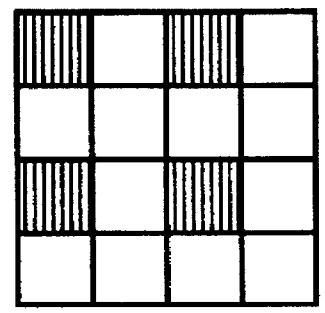
C=128/256
FIG. 3C

| 1 | W | 9 | W | 4 | W | 12 | W |
| W | 1 | W | 9 | W | 4 | W | 12 |
| 16 | W | 5 | W | 13 | W | 8 | W |
| W | 16 | W | 5 | W | 13 | W | 8 |
| 3 | W | 11 | W | 2 | W | 11 | W |
| W | 3 | W | 11 | W | 2 | W | 11 |
| 14 | W | 7 | W | 15 | W | 6 | W |
| W | 14 | W | 7 | W | 15 | W | 6 |
FIG. 4A
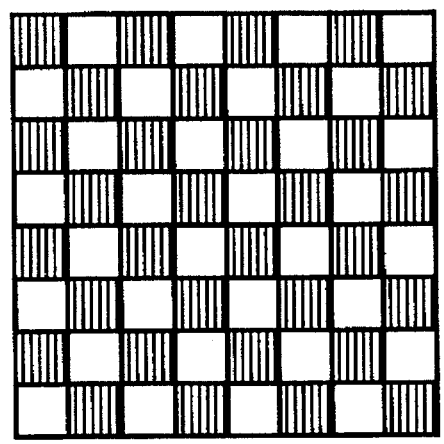
FIG. 4B
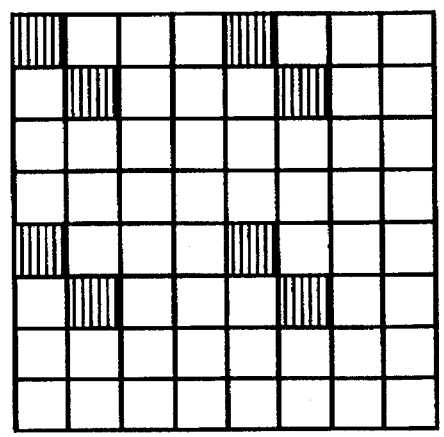
C=128/256
FIG. 4C (FIG. 3Cx4)  (FIG. 4Cx1)

MITIGATION OF TENTING DELETIONS IN COLOR XEROGRAPHIC PRINTERS

The present invention is directed to a method and apparatus for correcting imaging artifacts known as "tenting deletions" in color copiers, and more particularly to a method for efficiently reducing toner pile height in color xerographic images through image processing toner coverage reduction methods.

BACKGROUND OF THE INVENTION

Color images are commonly represented as a one or more separations, each separation comprising a set of color density signals for a single primary or secondary color. The color density signals are commonly represented as digital gray or contone pixels, varying in magnitude from a minimum to a maximum, with a number of gradations between corresponding to the bit density of the system. Thus, a common 8 bit system provides 256 shades of each separation color. A color can therefore be considered the combination of intensity of each separation color pixel, which when viewed together, present the combination color. Usually, printer signals include three subtractive primary colors (cyan, magenta and yellow) signals and a black signal, which together can be considered the printer colorant signals. Each color signal forms a separation, and when combined together with the other separations forms the color image. For printing, each separation causes a layer of toner to be deposited on a toner receiving substrate, in imagewise configuration, to from the color image.

Printers typically provide a limited number of output possibilities, and are commonly binary, i.e., they produce either a spot or no spot at a given location (although multilevel printers beyond binary are known). Thus, given a color separation with 256 shades of each additive primary color, a set of binary printer signals must be produced representing the contone effect. In such arrangements, over a given area in the separation having a number of contone pixels therein, each pixel value in an array of contone pixels within the area is compared to one of a set of preselected thresholds as taught, for example, in U.S. Pat. No. 4,149,194 to Holladay. The effect of such an arrangement is that, for an area where the image is a contone, some of the thresholds will be exceeded, i.e. the image value at that specific location is larger than the value of the threshold for that same location, while others are not. In the binary case, the pixels or cell elements for which the thresholds are exceeded might be printed as black or some color, while the remaining elements are allowed to remain white or uncolored, dependent on the actual physical quantity described by the data.

In some color xerographic printers, and with some object types, an imaging artifact is noted at the intersection of high density and low density areas. This artifact is known as a "tenting deletion" and appears as a faint halo effect in the low density area. The artifact may arise at the transfer step, and be caused by the inability of a substrate to conform to the imaging surface due to the high pile height of the high density area. In any case, the artifact is particularly notable with line art and text printing, particularly when dark text is printed on light backgrounds.

A logical solution to the problem is to reduce effective toner area coverage at text areas by introducing a toner reproduction curve that has a limited output response in high density areas. However, if this simplistic solution is pursued, the resultant text has a lower toner mass, but appears halftoned. Halftoned appearance in text and line art is generally undesirable.

In U.S. patent applications Ser. No. 071,917,643, filed Jul. 23, 1992, now U.S. Pat. No. 5,515,479 (EP 580376 A2, Jan. 26, 1994); Ser. No. 08/158,874, filed Nov. 29, 1993, now U.S. Pat. No. 5,519,815 (JP7-195714, published Aug. 1, 1995); Ser. No. 08/177,494, filed Jan. 3, 1994, now U.S. Pat. No. 5,563,985 (JP-7-245716, published Sep. 19, 1995); Ser. No. 08/313,520 filed Sep. 23, 1994; Ser. No. 08/291,371, filed Aug. 15, 1994 now U.S. Pat. No. 5,635,967 (EP-697784 A2, published Feb. 21, 1996), by Klassen, area coverage in already bitmapped images was addressed by a mask designed based on measured area coverage and desired area coverage.

The above references are herein incorporated by reference for their teachings.

SUMMARY OF THE INVENTION

The present invention is directed to a method of reducing toner area coverage in text and line art to reduce the tenting deletion artifact, while maintaining image appearance.

In accordance with one aspect of the invention, a printing system that uses a halftone processor is driven to halftone selected areas of an image based on a selected halftone dot, wherein the halftone dot has the properties of maintaining a dot fill order of a desired dot, while also maintaining a preselected percentage of the dot as unfilled space.

In accordance with yet another aspect of the invention, an initial halftone dot selected as suitable for use in association with a particular print engine, is modified by multiplying the number of spots in each cell by a predetermined value related to the desired reduction in area coverage. The resulting modified dot is comprised of sets of cells, where the set has a number of members greater than 1, each set of cells corresponding to one cell in the initial dot. As density of the area increases, a pre-selected percentage of cell in each set of cell is filled, in the same order that would have been expected for the initial cell. In following this fill in order, less toner is used than would have been used if only the initial dots had been used, halftoning artifacts are avoided and color is generally maintained. The thresholds for the modified dot may conveniently be loaded prior to use in a memory associated with the printing system.

In accordance with still another aspect of the invention, there is provided a printing system suitable for forming marks on a substrate at one of c possible levels of colorant, and receiving image signals represented at d possible levels, where d>c, and having a halftone processor to reduce the number of levels at which the image is represented from d levels to c levels in order to replicate gray level printing, including a memory, storing an set of halftone threshold level signals, each threshold signal corresponding to a unique location in an halftone cell; a comparator, receiving the image signal and one of the halftone threshold signals from the memory, and producing an output signal at one of c possible levels, varying according to the comparison of the halftone threshold signal to the image signal to cause marking at a selected location on a substrate; the set of threshold level signals including a plurality of signals grouped in clusters of predetermined size, each cluster having at least one non-fixed threshold value varying between a minimum value and a maximum value, and at least one fixed value preventing mark formation at a corresponding location, the threshold level signals defining a switching order for varying values of gray in which non-fixed values in each cluster are switched among c levels with varying input value. In one of the most common printing systems, c=2. It may also be desirable to include a control system, selecting the set of threshold signals when a region of the image including text images is to be reproduced.

In accordance with still another aspect of the invention, there is provided a method of altering an image representation to prevent tenting deletions in a color printing system receiving image signals represented at d possible levels, by generating printer signals that retain original color characteristics and provide significantly reduced colorant coverage upon printing, where the color printing system includes a halftoning system that generates printer signals adapted to drive a printer to generate a mark on a substrate at one of c possible levels of colorant, where d>c, the halftoning system using a desired screen matrix have N number of thresholds and N number of threshold values in a K×L matrix, each threshold corresponding to a printer signal in an image to be printed, the method comprising the steps of determining a percentage of coverage reduction required to mitigate tenting deletions; multiplying N number of thresholds by M, a number related to the coverage reduction percentage, to obtain an increase in the number of thresholds in the screen matrix, thereby obtaining M×N number of thresholds, while retaining N number of threshold values in the screen matrix; setting a percentage of the M×N thresholds to a system value preventing printing of corresponding image signals, the percentage related to the coverage reduction percentage; printing a image signals for each threshold value which is exceeded in the screen matrix.

Figure 2:
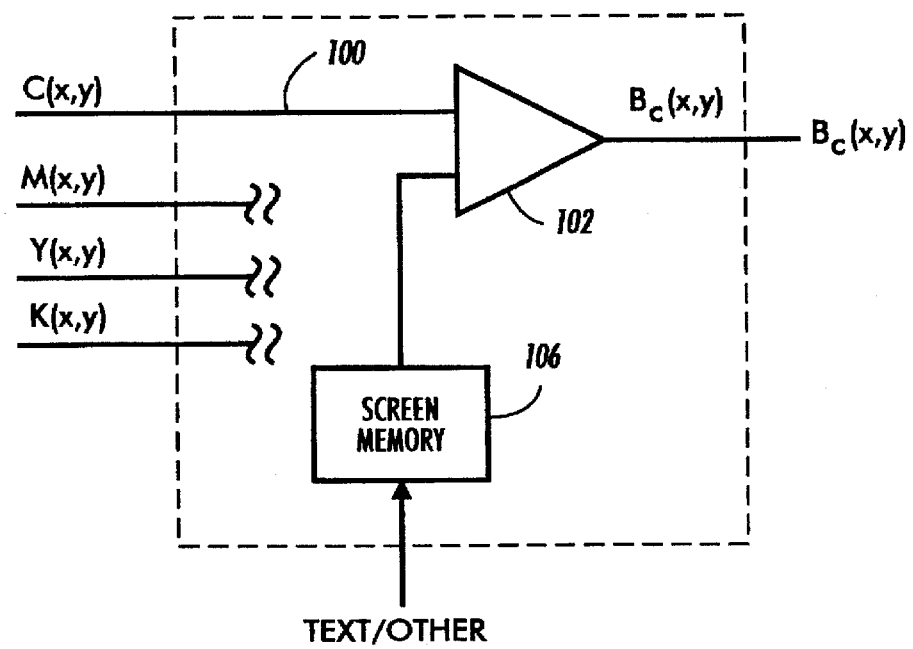
Figure 5:
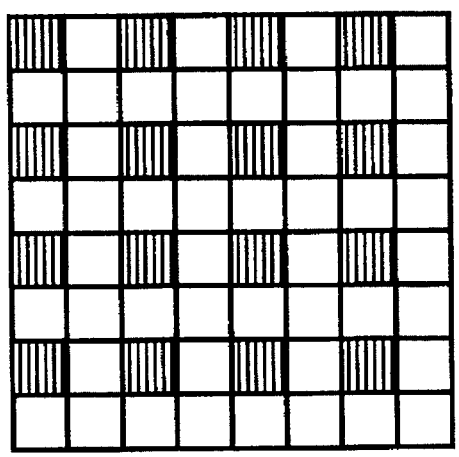
Figure 5:
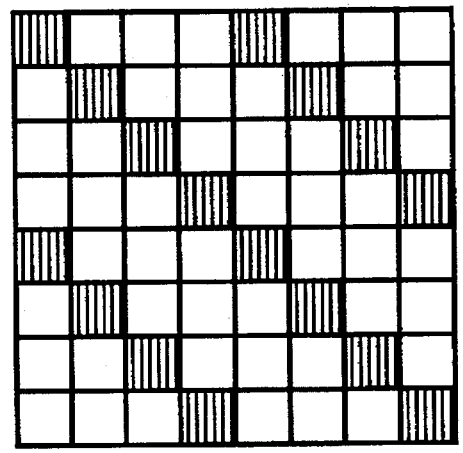

The present invention seeks to provide a toner coverage reduction process that can work at the halftoning processor of a printing system, so that changes to other processes can be avoided. These and other aspects of the invention will become apparent from the following descriptions used to illustrate a preferred embodiment of the invention, read in conjunction with the accompanying drawings in which:

FIGS. 1 and 2 represent a halftoning system;

FIGS. 3A, 3B, and 3C illustrate a 4×4 Bayer dot respectively showing the screen matrix, the maximum coverage (with 50% reduction) and a mid-level dot;

FIGS. 4A, 4B, and 4C illustrate respectively, an example screen matrix, maximum dot (with 50% coverage) and a mid-level dot of the dot of the present invention; and FIG. 5 illustrates a comparison of the Bayer dot and the dot produced by the present invention over an 8×8 area.

Referring now to the drawings where the showings are for the purpose of describing the preferred embodiment of the invention and not for limiting same, a basic system for carrying our the present invention is illustrated. In the present case, continuous tone or contone image data may be characterized as image signals. An image signal corresponding to a particular location in the image, is referred to as a pixel. Each pixel is defined at a single level or optical density in a set of 'c' optical densities, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of contone levels to one of two legal or allowed binary levels for printing in a binary printer. We will use the term "halftone" here to refer any method of processing image data initially defined at 'c' optical density levels to a new, smaller set of 'd' levels.

As used herein, the term "dot" refers to a product or an image resulting from a screening process. A "screen cell", as used herein, refers to the set of pixels which together will form the dot, while the term "screen matrix" will be used to describe the set of values which together make up the set of threshold to be applied. Each pixel in the screen cell will be thresholded with one of the threshold values in the screen matrix. A dot is made up of a plurality of pixels.

In the particular system to be discussed, documents are represented by image signals. A "color image" is a document including at least two separations of image signals, each set (or separation) represented by an independent channel, which may be processed independently. Each set of signals or separation is used to drive the printer to reproduce in an image, perhaps with different colorants, so that a final image which may comprise multiple separations superposed, can be obtained.

With reference now to FIG. 1, which shows a general system requirement representing the goal of the invention, an electronic representation of a document (hereinafter, an image) is directed into a printing system for printing. The systems contemplated receive Page Description Language (PDL) files, which describe the page to be printed. Particularly, a page described by a PDL will be defined by one or more objects which are described in the file in terms of object type, size, color and position on the page. Because the rendition of color is peculiar to a machine, color is defined in terms of device independent terms which must then be converted to printer specific signals at a PDL decomposer 10. For our purposes however, it is also important to note that the PDL file provides object type information, thereby indicating the presence of text or line art, as well as color information. From the point of view of the present invention, the decomposer includes the functions of rendering the bitmaps appropriately, as well as providing color conversion from device independent color descriptions to device dependent color descriptions, although this may not necessarily be the case. The output of PDL decomposer 10 therefore includes a plurality of separations or separation bitmaps C(x,y), M(x,y), Y(x,y) and K(x,y) (where K refers to black). An additional output of decomposer 10 is a test or other signal O(x,y) indicating the type of object which is decomposed at any position (x,y).

At this point, the image is in terms of gray values, where each gray value is defined at a number of levels "c", which is greater than a desired number of levels "d". In a typical application, each value or pixel is defined by 8 bits at one of 256 levels, while for printing, the value or pixel must be defined as a binary value, or at two level. Each of the separations is directed to a halftoner 12 which will halftone each separation. Halftoner 12 also receives Text/Other signal O(x,y), which will control the operation of halftoner 12.

Once the color defined by the PDL file is converted to printer dependent signals, and the PDL file is decomposed or rendered, the resulting color images may be defined by a plurality of bitmaps, or separations. The electronic image signals are directed for reproduction on image output terminal or printer 14.

FIG. 2 shows halftone processor 12 operational characteristics. A set of continuous tone signals such as, for example, the cyan separation C(x,y) are obtained, at an input 100 to screening processor 102 (here a comparator), to be processed for screening purposes to reduce an c level input to an d level output, where x and y represent two dimensional position on a page. A screen matrix (a set of threshold values), is conveniently stored at 106, which, for a given gray level reproduces a periodic dot pattern. While screening may be described for simplicity as the addition of a set of selected screen values to image signals within a defined area of the image, in conjunction with a uniform application of a threshold level(s) to the combined values, it will be understood that the process of screening may also be represented by a set of varying thresholds defined at locations corresponding to pixels over a given area of the image. A screen cell is generally smaller than the total image and will be replicated in a predetermined scheme for processing the image in order to cover an area of the image. The output of a process using a screen cell is a set of pixels, defined by a set of levels having a number of members less than the input set of values. Commonly, the set of d level output values is binary, either color or white, or a spot or no spot, although the values might be gray. The screening processor 102 returns an n bit value representing the separation, where n-bits provides d levels of density.

In accordance with a standard halftoning technique, a linear halftone cell retrieved from memory 106 (for example, see U.S. Pat. No. 4,149,194 to Holladay, incorporated by reference herein), which is essentially an ordered list of potential threshold values. During the halftoning process, the gray values of the separation $C(x,y)$ will be compared to the threshold values to determine a printable output, $B_c(x,y)$.

In accordance with the invention, screen matrices differ in the arrangements of thresholds through the cell. Changes in gray level are reflected by the pattern of thresholds that are exceeded by changing gray levels. Distinct screen matrices are often selected for use based on the type of printers One type of screen matrix, the Bayer dot, has the characteristic that pixels are changed to a from white to color in accordance with a turn ON pattern that attempts to maintain distance between pixels that are turned on in succession as intensity increases. In print products which are able to print dots very accurately, such a turn ON pattern results in a smooth TRC curve. The Bayer dot can be contrasted to a clustered dot, often used in xerographic processes, where the reproduction process has difficulty in printing single spots surrounded by white or white spots surrounded by black. By clustering dots, reproducibility is enhanced. In both screen matrices, the same thresholds might be used, but the turn ON pattern varies.

In considering the problem of tenting artifacts, it is desirable to reduce the amount of colorant used in reproduction. As previously noted this can be done by simply capping the level at which pixels will be turned ON in a screen cell. FIG. 3B shows an example Bayer dot. If, in a 16 level system, a reduction in colorant coverage to 50% is desired, the maximum threshold that will be exceeded will be level 8. Referring now to FIG. 3C, a dot is illustrated representing a gray value of 128/256, while providing a maximum coverage of 50%. The pattern shown gives an undesirable halftone appearance affect, when, for text, a saturated solid is desired.

Applicant seeks to improve the appearance of the dot, when used with coverage reduction. Accordingly, it is initially proposed to resize the dot by a selected scale value. In the example shown in FIG. 4A, the dot has been increased in size by a factor of 2 in each direction. Other scale factors are possible. After increasing the scale of the dot, the new screen cell will include 64 pixels.

Rather than treating this new screen cell as a standard screen matrix of 64 values, we treat the screen cell as having 16 groups of 4 cells. The fill order for each of these 16 groups will remain as if the screen cell was still at 16 pixel set. Accordingly, some members of each group will be filled in the same order that the Bayer dot would have been filled.

In order to accomplish coverage reduction, within each group of four pixels, only a selected number will be filled. For 50% reduction, only two pixels out of every four will be filled. Accordingly, for each of the 16 gray levels possible in the system, two pixel will be filled as each of the 16 threshold are exceeded. Referring to FIG. 4A, the screen matrix can be seen, where each level is indicated, and pixels that will not be filled our indicated as white (W). Referring to FIG. 4B, the 50% maximum level is shown, which is essentially identical to the 50% maximum level of the standard Bayer dot. However, looking at the representation of 128/256, shown in FIG. 4C, one can see a marked change in the growth pattern of the halftone dot. Referring now to FIG. 5, where a group of four 4×4 Bayer dots are illustrated adjacent to an 8×8 dot constructed in accordance with the invention, one can see the strong 90 degree pattern created by the 4×4 dots. However, the 8×8 dot shows an apparent more acceptable growth pattern that will both allow reduction of the tenting artifact, while minimizing the halftoned appearance of the text area.

One possible embodiment of the present invention includes the generation of the scale values and load.

It will no doubt be appreciated that expansion or scaling of an original screen cell by selected scale factors can aid in providing an amount of coverage reduction. Thus, if a 4×4 pattern is scaled by a factor of 2, coverage reduction of 25%, 50% and 75% is possible. If a 4×4 pattern is scaled by a factor of 3, coverage reduction from about 11% to about 90% is possible in increments of about 11%.

While we have shown the present invention in use with a Bayer dot, the principle of the present invention may be used with a variety of other dots.

It will be noted that, for certain PDL's including Postscript, an indication of full color on (i.e., 100% colorant over an area) is commonly treated as a special case of color, and not directed to the halftoning system. If this were allowed, the present invention could not be implemented. In accordance with the present invention, if any separation has a value indicating 100% colorant (often given as 0 in a 256 level system, where 0 is a maximum color and 255 is white or no color) that value is forced to be at least one level less that 100% colorant. In the case of a 256 level system, such color might be forced to 1.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A method of altering an image representation to prevent tenting deletions in a color printing system receiving image signals represented at d possible levels, by generating printer signals that retain original color characteristics and provide significantly reduced colorant coverage upon printing, where the color printing system includes a halftoning system that generates printer signals adapted to drive a printer to generate a mark on a substrate at one of c possible levels of colorant, where d>c, said halftoning system using a desired screen matrix have N number of thresholds and N number of threshold values in a K×L matrix, each threshold corresponding to a printer signal in an image to be printed, said method comprising the steps of:

determining a percentage of coverage reduction required to mitigate tenting deletions;

multiplying N number of thresholds by M, a number related to the coverage reduction percentage, to obtain an increase in the number of thresholds in the screen matrix, thereby obtaining M×N number of thresholds, while retaining N number of threshold values in the screen matrix;

setting a percentage of the M×N thresholds to a system value preventing printing of corresponding image signals, said percentage related to the coverage reduction percentage;

printing a image signal for each threshold value which is exceeded in the screen matrix.

2. The method as described in claim 1, and including the step of initially detecting whether the image includes text information, and proceeding to subsequent steps only upon a positive determination thereof.

3. A printing system suitable for forming marks on a substrate at one of c possible levels of colorant, and receiving image signals represented at d possible levels, where d>c, and having a halftone processor to reduce the number of levels at which the image is represented from d levels to c levels in order to replicate gray level printing, including:

a memory, storing a set of halftone threshold level signals, each threshold signal corresponding to a unique location in an halftone cell;

a comparator, receiving said image signal and one of the halftone threshold signals from the memory, and producing an output signal at one of c possible levels, varying according to the comparison of said halftone threshold signal to said image signal to cause marking at a selected location on a substrate;

said set of threshold level signals including a plurality of signals grouped in clusters of predetermined size, each cluster having at least a first threshold value varying between a minimum value and a maximum value, and at least a second threshold value preventing mark formation at a corresponding location, said threshold level signals defining a switching order for varying values of gray in which non-fixed values in each cluster are switched among c levels with varying input values.

4. The system as defined in claim 3 wherein C=2.

5. The system as defined in claim 3, wherein said set of threshold level signals form an n×m array, corresponding to an n×m array of input signals representing the image at d possible levels.

6. The system as defined in claim 3, wherein said clusters of predetermined size, have a size of at least 2×2, where N>2 and M>2 and at least 2 non-fixed threshold values varying between a minimum value and a maximum value, and, for varying values of gray, said at least 2 non-fixed threshold values are switched among c levels with varying input values.

7. The system as defined in claim 3, wherein said clusters of predetermined size, have a size of at least 2×2, where N>2 and M>2 and at least 1 fixed threshold level preventing mark formation at corresponding locations.

8. The system as defined in claim 3, and including a control system, selecting said set of threshold signals when a region of the image including text images is to be reproduced.

9. An image processing system suitable for generating signals adapted to drive a printer to generate a mark on a substrate at one of c possible levels of colorant, receiving image signals represented at d possible levels, where d>c, and including a halftone processor to reduce the number of levels at which the image is represented from d levels to c levels in order to replicate gray level images, said halftoning system responsive to a screen matrix stored in a halftone processor memory, said screen matrix including:

a set of N threshold level signals including a plurality of signals grouped in clusters of predetermined size, each cluster having at least 1 threshold value preventing mark formation at a corresponding location, and at least 1 varying threshold level signal;

said threshold signals ordered in said set to defining a switching order responsive to varying values of gray, and in which plural varying values in each cluster are switched among c levels simultaneously.

10. The system as defined in claim 9 wherein C=2.

11. The system as defined in claim 9 wherein said set of threshold level signals form an n×m array, corresponding to an n×m array of input signals representing the image at d possible levels.

* * * * *